(12) United States Patent
Yonetsu

(10) Patent No.: US 6,797,055 B2
(45) Date of Patent: Sep. 28, 2004

(54) COMBINATION WEIGHING APPARATUS WITH TWO DIFFERENT MODES, ONE MODE WHERE ALL HOPPERS ARE INVOLVED IN A COMBINATIONAL CALCULATION AND ANOTHER MODE WHERE COMBINATIONAL CALCULATION IS CARRIED OUT ONLY ON A FIRST GROUP OF WEIGHING HOPPERS AND WHERE A SECOND GROUP OF HOPPERS MAY BE DISCHARGED OR NOT BASED ON A WEIGHT INDEPENDENT CRITERIA

(75) Inventor: Michihiko Yonetsu, Ritto (JP)

(73) Assignee: Ishida Co., Ltd., Shiga (JP)

( * ) Notice: Subject to any disclaimer, the term of this patent is extended or adjusted under 35 U.S.C. 154(b) by 57 days.

(21) Appl. No.: 10/042,145

(22) Filed: Jan. 11, 2002

(65) Prior Publication Data
US 2002/0096370 A1 Jul. 25, 2002

(30) Foreign Application Priority Data
Jan. 19, 2001 (JP) ...................................... 2001-011062

(51) Int. Cl.[7] .......................................... G01G 19/387
(52) U.S. Cl. .................................................... 117/25.18
(58) Field of Search ..................................... 177/25.18

(56) References Cited

U.S. PATENT DOCUMENTS

| | | | | |
|---|---|---|---|---|
| 4,678,046 A | | 7/1987 | Mosher | 177/25.18 |
| 4,813,503 A | * | 3/1989 | Douglas et al. | 177/25.18 |
| 4,828,054 A | * | 5/1989 | Mosher | 177/25.18 |
| 4,844,190 A | | 7/1989 | Mikami et al. | 177/25.18 |
| 5,084,832 A | * | 1/1992 | Yamada et al. | 177/25.18 |
| 5,753,867 A | * | 5/1998 | Konishi et al. | 177/25.18 |

FOREIGN PATENT DOCUMENTS

| | | | | |
|---|---|---|---|---|
| GB | 2 147 111 A | | 5/1985 | |
| JP | 62-294918 A | | 12/1987 | |
| JP | 63-206619 A | | 8/1988 | |
| JP | 5-79890 A | | 3/1993 | |
| JP | H05-079890 | * | 3/1993 | 177/25.18 |

* cited by examiner

Primary Examiner—Randy Gibson
(74) Attorney, Agent, or Firm—Shinjyu Global IP Couselors, LLP

(57) ABSTRACT

The weights of articles that are held in normal weighing hoppers are combined and a combination weighing takes places such that the total weight of the articles is within a predetermined weight range. When a combination weighing takes place and the articles that are held in the normal weighing hoppers are selected, special articles that are held in a special weighing hopper specified according to a specification routine are discharged. The present invention provides a general use combination weighing apparatus that is capable of changing the composition of combined articles discharged from the combination weighing apparatus according to predetermined conditions, without requiring a change in software and preferably without taking up a great deal of space.

20 Claims, 3 Drawing Sheets

COMBINATION WEIGHING APPARATUS WITH TWO DIFFERENT MODES, ONE MODE WHERE ALL HOPPERS ARE INVOLVED IN A COMBINATIONAL CALCULATION AND ANOTHER MODE WHERE COMBINATIONAL CALCULATION IS CARRIED OUT ONLY ON A FIRST GROUP OF WEIGHING HOPPERS AND WHERE A SECOND GROUP OF HOPPERS MAY BE DISCHARGED OR NOT BASED ON A WEIGHT INDEPENDENT CRITERIA

BACKGROUND OF THE INVENTION

1. Field of the Invention

This invention generally relates to a combination weighing apparatus. More specifically, the present invention relates to a combination weighing apparatus that changes the composition of combined articles based upon predetermined conditions.

2. Background Information

A combination weighing apparatus is generally employed in order to quickly and accurately weigh items that have a variety of irregular weights, such as confections and fruits. The combination weighing apparatus combination calculates the weight of each item, selects the hopper combination in which the total weight is within a predetermined weight range, and discharges the weighed items.

When other supplemental articles are to be loaded in with the combined and weighed items, a separate automatic loader is often employed. The automatic loader is, for example, a machine that loads in articles such as an oxygen absorbent with items such as confections in order to preserve the quality of the confections, a machine that loads in discount cards with items such as snack foods, a machine that loads in additional candy balls of different colors or sizes with candy balls, and the like. The automatic loader is capable of loading additional articles in response to a synchronizing signal transmitted from the combination weighing apparatus. In this way, the automatic loader is capable of containing and discharging articles other than the weighed items.

However, when the automatic loader tries to deal with different types of loading pattern, it is necessary to change the software used by the separate device. In addition, it is also necessary to change the software for the combination weighing apparatus used along with the separate device. Moreover, the automatic loader is difficult to use in small spaces because it is necessary to place the automatic loader separately from the combination weighing apparatus.

In view of the above, there exists a need for combination weighing apparatus which overcomes the above mentioned problems in the prior art. This invention addresses this need in the prior art as well as other needs, which will become apparent to those skilled in the art from this disclosure.

SUMMARY OF THE INVENTION

An object of the present invention is to provide a general purpose combination weighing apparatus that is capable of changing the composition of articles combined and discharged therefrom according to predetermined conditions, without having to change the software for each apparatus and preferably without taking up a great deal of space.

A combination weighing apparatus is a combination weighing apparatus in which articles placed in a plurality of hoppers are combined and discharged, and comprises a plurality of hoppers, a storage means, a specification means, a weighing means, a selection means, and a discharge means. The plurality of hoppers hold articles. The storage means divides and stores the plurality of hoppers into a first group and a second group. The specification means specifies discharge to hoppers in the first group based upon predetermined criteria. The weighing means are provided in each hopper in the second group, and weighs the articles held in the hoppers in the second group. The selection means combines the weights of the hoppers in the second group that were weighed with the weighing means, and selects the hoppers in the second group based upon the results of the combination calculation. The discharge means simultaneously discharges the articles held in the hoppers in at least the first group that were designated for discharge by the specification means and the hoppers in the second group selected by the selection means.

Here, from amongst the plurality of hoppers of the combination weighing apparatus, the weights of the articles held in the hoppers in the second group are combined, and combination weighing takes place such that the total weight is within a predetermined weight range. After this, the articles held in the selected hoppers which were combination weighed and the specified hoppers in the first group are discharged. In this way, it is not necessary to change the loading apparatus software. In addition, depending on the shape of the articles, it is possible to add supplemental items to the combination weighed articles and discharge them without attaching an additional apparatus to the exterior of the combination weighing apparatus. The composition of the combination weighed articles discharged by a single combination weighing apparatus can be changed.

In addition, the predetermined weight range includes a target weight or a target quantity.

Preferably, in the combination weighing apparatus, the articles held in the hoppers in the first group are of a different type than the articles held in the hoppers in the second group.

Here, the type of articles held in first group and the second group are different. In this way, the production of combination articles with added value is made possible because other types of articles can be added to the articles held in the second group that were combination weighed.

Preferably, the combination weighing apparatus further comprises a weighing means provided in the hoppers in the first group.

Here, articles held therein can be weighed because the weighing means is provided in the hoppers in the first group. In this way, it becomes possible to confirm whether articles are held in the hoppers in the first group, and also confirm the weight, quantity, and the like of the articles loaded therein.

Preferably, in the combination weighing apparatus, the selection means combines the weights of the hoppers in all groups and performs a combination calculation such that the total weight is within a predetermined weight range. Based on the results of the combination calculation, a normal selection of hoppers also takes place. The discharge means conducts a normal discharge of the articles held in the hoppers designated for discharge by means of a normal selection by the selection means. The combination weighing apparatus further comprises a weight switching means that switches between selection and discharge and normal selection and normal discharge.

Here, the combination weighing apparatus further comprises a weight switching means that switches it to a combination weighing apparatus that performs a combination calculation for all hoppers. By employing a weight switching means, the combination weighing apparatus can be converted to one having the function of a general combination weighing apparatus. Because of this, the production of combination articles can be diversified, and, in the case of normal weighing, the accuracy is improved because the number of hoppers that participate in the combination calculation is increased.

Preferably, in the combination weighing apparatus, the selection means subtracts from the predetermined weight range of the hoppers in the first group designated for discharge by the specification means, and based on that figure, combines the weights of the hoppers in the second group and selects them.

Here, by adding the weights of the articles held in the hoppers of the first group that will be discharged with the articles in the second group that will be combination weighed and discharged, articles of the first group and the second group will be discharged. Because of this, manufacturing a combination article that is 100 g and which includes special articles therein is made possible, as is a combination article that is 100 g but does not include special articles therein.

Preferably, in the combination weighing apparatus, the predetermined criteria is based on a random number.

Here, the specification means specifies the hoppers in the first group based upon a random number. In this way, articles that are held in the hoppers in the first group can be randomly added to the articles that have been combination weighed from the hoppers in the second group.

Preferably, in the combination weighing apparatus, the predetermined criteria is based upon periodic conditions.

Here, while the hoppers in the second group are discharged a fixed number of times, the specification means specifies the hoppers in the first group based upon periodic conditions such as a fixed interval of space, a fixed interval of time, and the like. For example, for every 10 times the hoppers in the second group are discharged, it becomes possible for the hoppers in the first group to be discharged one time, or for the hoppers in the first group to be discharged every minute. In this way, articles that are held in the hoppers in the first group can be periodically added to the articles that were combination weighed from the hoppers in the second group.

Preferably, in the combination weighing apparatus, the predetermined criteria is based upon ratio conditions.

Here, the specification means specifies such that the hoppers in the first group are discharged a fixed percentage of times with respect to a predetermined number of times that the hoppers in the second group are discharged. In this way, the articles that are held in the hoppers in the first group can be added at a fixed rate with respect to the articles that were combination weighed from the hoppers in the second group. For example, for 10,000 discharges of the hoppers in the second group, the specification means specifies that the hoppers in the first group are discharged 100 times.

Preferably, in the combination weighing apparatus, the specification means further includes a continuous discharge criteria that continuously specifies the discharge of the hoppers in the first group, and further comprises a discharge switching means that switches between the predetermined criteria and the continuous discharge criteria.

Here, the specification means discharges the hoppers in the second group, and continuously specifies the hoppers in the first group. In this way, articles that are held in the hoppers in the first group can be continuously added to the articles that have been combination weighed from the hoppers in the second group. By employing a discharge switching means, one can switch between a so-called parent-child weight setting in which the first group is constantly discharged, and a setting in which the first group is discharged according to predetermined criteria. In this way, combination weighing can be more widely used.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
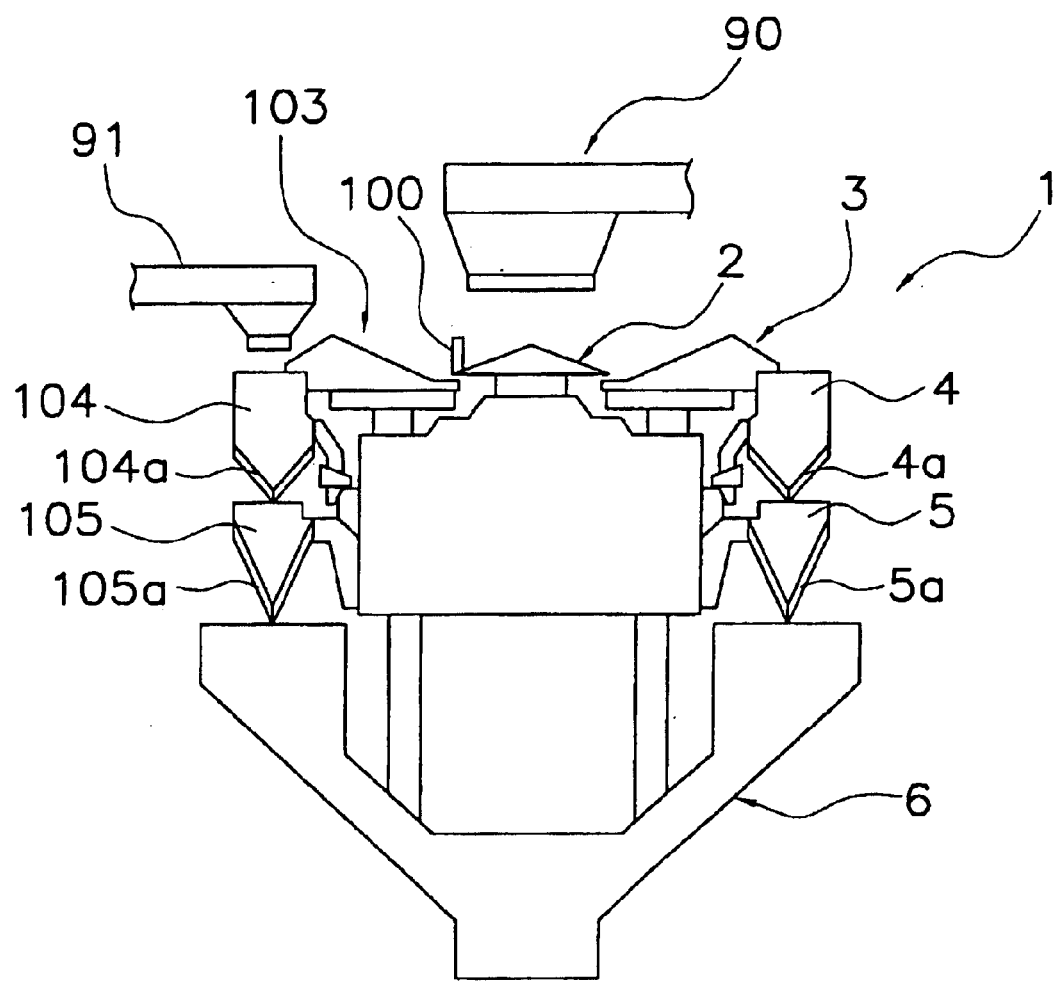
FIG. 1 is a lateral schematic diagram of a combination weighing apparatus according to the present invention.

An embodiment of a combination weighing apparatus according to the present invention is shown in FIG. 1. A combination weighing apparatus 1 selects hoppers to be combined that are within a set weight range, discharges articles from the hoppers that hold articles, and discharges supplemental special articles according to predetermined conditions, by combination calculating the weights of each of the articles that are held in the hoppers.

<Overall Construction>

Figure 2:
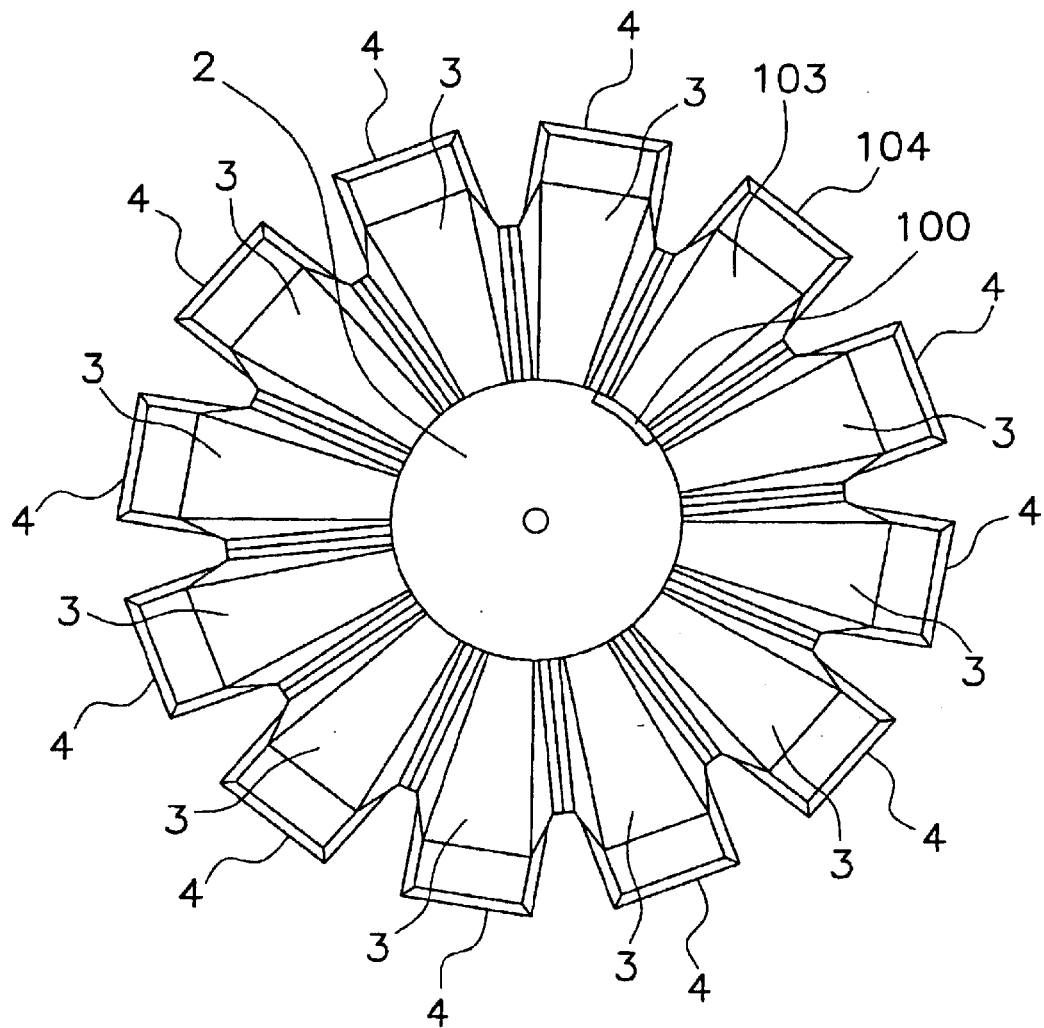
FIG. 2 is a top view of the upper surface of the combination weighing apparatus according to the present invention.

The combination weighing apparatus 1 comprises a dispersion feeder 2, a radiating feeder that includes 11 regular radiating feeders 3 and a single special radiating feeder 103, a pool hopper that includes 11 normal pool hoppers 4 and a single special pool hopper 104, a weighing hopper that includes 11 normal weighing hoppers 5 and a single special weighing hopper 105, a collection discharge chute 6, a controller 20, and an operation panel 40. The radiating feeders, pool hoppers and weighing hoppers are each disposed in a circular pattern. A plan view of the combination weighing apparatus 1 is shown in FIG. 2.

In addition, the radiating feeders, pool hoppers and weighing hoppers are collectively called heads. The heads run from a first head to a twelfth head. On the other hand, the special radiating feeder 103, the special pool hopper 104, and the special weighing hopper 105 is associated with a special head. In the present embodiment, the twelfth head is a special head, and the first through b 11th heads are normal heads.

<Construction of Each Portion of the Main Body of the Combination Weighing Apparatus>

The dispersion feeder 2 is a member that is a flat cone shaped table. A supply conveyor 90 that is provided on the upper portion of the dispersion feeder 2 supplies articles to the dispersion feeder 2. The dispersion feeder 2 oscillates by means of a magnet on the lower portion thereof (not shown in the figures), disperses articles supplied on the upper surface thereof in the circumferential direction while conveying them in the longitudinal direction, and supplies the articles to the special radiating feeder 103. In addition, the dispersion feeder 2 includes a guide plate 100 on the portion that faces the special radiating feeder 103, so that articles supplied to the dispersion feeder 2 are not supplied to the special head.

Special articles are supplied from directly above the special pool hopper 104 to the special head by a special article supply conveyor 91 (see FIG. 1). In addition, the special article supply conveyor 91 may also be disposed so that special articles are supplied from directly above the special radiating feeder 103.

The radiating feeders are metal plate members that are formed from stainless steel, and disposed around the circumference of the dispersion feeder 2. The radiating feeders oscillate by means of magnets on the lower portions thereof (not shown in the figures), convey articles in the longitudinal direction, and supply articles to the pool hopper associated with each head. In addition, the conveying capacity of each radiating feeder is regulated by the amplitude and frequency of the vibrations of the magnets. In this way, the weight of articles that are held in each hopper is controlled so that it is within a predetermined weight range.

The pool hoppers are members that temporarily store articles that were supplied from the radiating feeder associated with each head. The pool hoppers are disposed on the lower ends of each radiating feeder. The normal pool hoppers 4 and the special pool hopper 104 open gates 4a and a gate 104a provided on the lower portions thereof by means of commands from the controller (described below), and supply articles to the weighing hopper associated with each head.

The weighing hoppers are members that measure the weight of articles supplied from the pool hoppers by means of load cells. The normal weighting hoppers 5 and the special weighing hopper 105 are disposed directly below each normal pool hopper 4 and special pool hopper 104. The normal weighing hoppers 5 and the special weighing hopper 105 discharge to a collection discharge chute 6 by opening gates 5a and gate 105a provided on each lower portion thereof by means of commands from the controller (described below).

The load cells are weight measurement devices that weigh the items that are held in each weighing hopper. Normal load cells 10 weigh items that normal weighing hoppers 5 hold. A special load cell 110 weighs items that the special weighing hopper 105 holds. The load cells send the weights of the articles to a RAM 23 as weight signals. A CPU 21 employs the weight signals in a selection routine 32 (described below).

The collection discharge chute 6 is a member that collects and discharges downward the articles discharged from each normal weighing hopper 5 and the special weighing hopper 105.

<Construction of the Operation Panel>

The operation panel 40 is capable of receiving input from an operator of the combination weighing apparatus 1 on the weight range setting for combination weighing, and input on the designation setting for the special head. In addition, the operation panel 40 also displays the condition of the combination weighing apparatus 1.

<Construction of the Controller>

Figure 3:
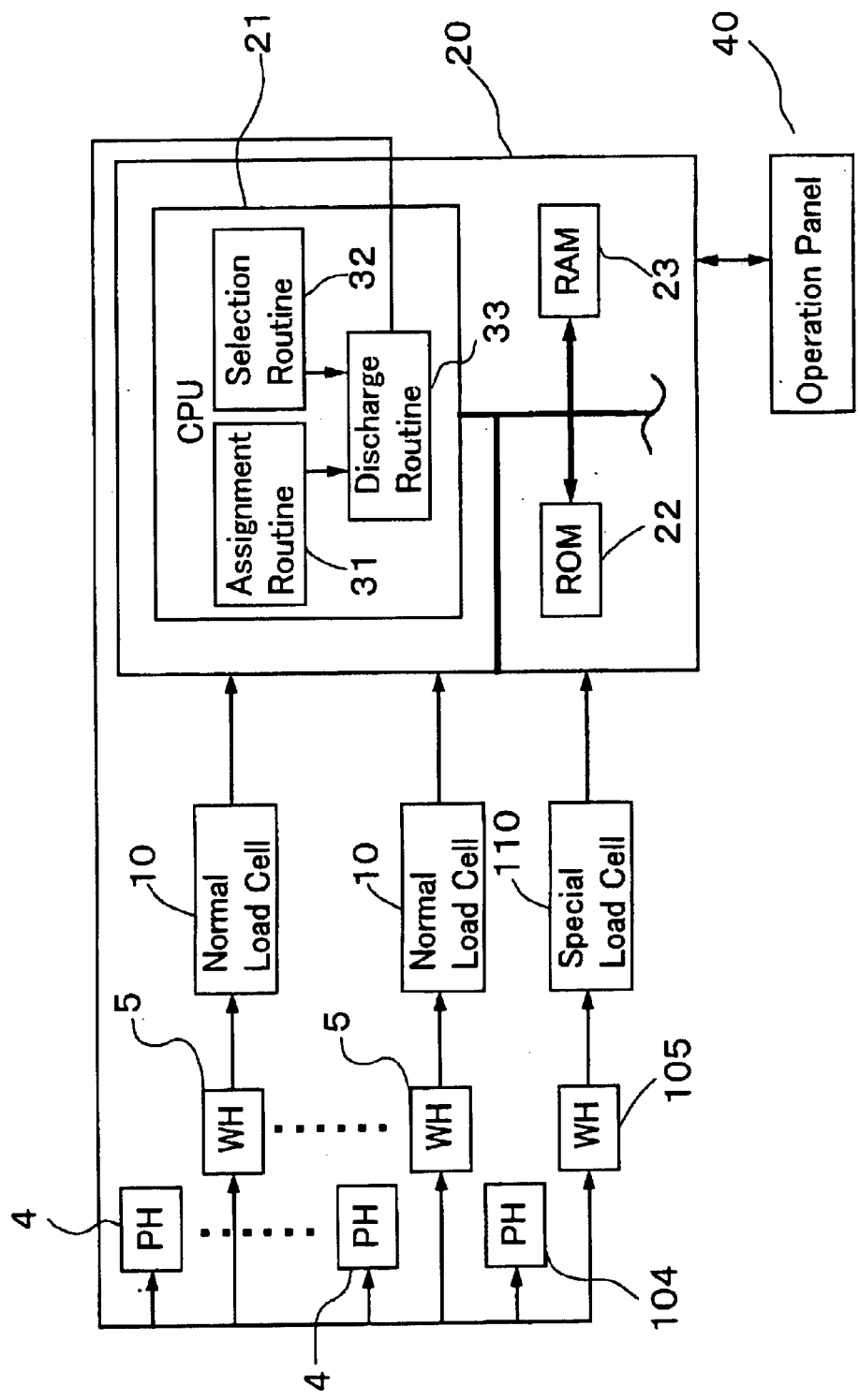
FIG. 3 is a signal block diagram of the combination weighing apparatus according to the present invention.

The controller 20 controls the combination weighing apparatus 1. In particular, the controller 20 controls the combination weighing of articles. The signal blocks for the combination weighing device 1 are shown in FIG. 3.

The controller 20 comprises a CPU 21, and a ROM 22 and a RAM 23 that serve as memory means. The signals from the load cells and the signals from the controller 20 are sent and received via a bus that connects all of the components.

[CPU]

The CPU 21 is the nucleus for control of the combination weighing apparatus 1. A control program operates in the CPU 21, and includes an assignment routine 31, a selection routine 32 and a discharge routine 33.

(Memory Means)

The memory means stores the control program and the like for the combination weighing apparatus 1. In addition, the RAM 23 of the memory means separates the special head (first group) from the plurality of heads, and stores it separately from the remaining normal heads (second group). In the present embodiment, the twelfth head serves as the special head, and the radiating feeder associated with the twelfth head, the pool feeder, and the weighing feeder respectively serve as the special radiating feeder 103, the special pool hopper 104 and the special weighing hopper 105. On the other hand, the radiating feeders, the pool hoppers, and the weighing hoppers associated with the first through eleventh heads respectively serve as the normal radiating feeders 3, the normal pool hoppers 4, and the normal weighing hoppers 5.

In addition, the head settings stored in the RAM 23 are set via the operation panel 40. These settings can only be set before operating the combination weighing apparatus 1.

(Assignment Routine)

When predetermined conditions are satisfied, the assignment routine is a routine that specifies the discharge timing of the gate 105a of the special weighing hopper 105. The CPU 21 transmits the results of the assignment to the discharge routine 33.

The predetermined conditions are set via input to the operation panel 40. The predetermined conditions are periodic conditions that assign the number of times that each article is discharged by the discharge routine 33, random conditions in which the assignment of special articles is conducted completely at random, and ratio conditions in which, from amongst the plurality of times that articles are discharged (for example, 10 times), special articles are assigned by the discharge routine 33 a random number of times (for example, 2 times). When the predetermined conditions are set, they are stored in RAM 23.

(Selection Routine)

The selection routine 32 is a routine that, based upon the weights stored in the RAM 23, combines the articles that are held in each normal weighing hopper 5 and combination calculates them so that they fall within a set weight range. The CPU 21 selects a plurality of normal weighing hoppers 5 from the 11 normal weighing hoppers 5 based upon the results of the combination calculation by the selection routine 32, and transmits this selection result to the discharge routine 33.

(Discharge Routine)

When there are weighing hoppers that are identified as having no articles or special articles therein by means of the weighing signals from the load cells, the discharge routine 33 is a routine that transmits a signal that opens the gates on the pool hoppers on those heads. In this way, empty weight hoppers can be replenished with articles or special articles.

In addition, the discharge routine 33 transmits a signal that opens the gates 5a on the plurality of the normal hoppers 5 that were selected in the selection results of the selection routine 32. In the event that the gate 105a on the special weighing hopper 105 is assigned by the assignment routine 31, a signal is transmitted that opens gate 105a.

By running the discharge routine 33, the CPU 21 either adds special articles to the articles that are within a set weight range, or discharges the articles within a set weight range from the collection discharge chute 6. In this way, special articles can be mixed in with the articles discharged from the collection discharge chute 6 or left as is. Moreover, the articles discharged from the collection chute 6 can be supplied and processed by other devices downstream thereof <Special Characteristics of the Combination Weighing Apparatus>

By storing a special head, the combination weighing apparatus 1 according to the present embodiment can incorporate special articles that are held in a special weighing hopper 105 with articles that are combination calculated and selected in the normal hoppers 5 according to predetermined conditions. In this way, articles that have been combination weighed can be supplemented with other items without attaching another apparatus to the combination weighing apparatus 1.

The special weighing hopper 105 is capable of weighing by means of the special load cell 110. In this way, special articles can be reliably added because it can be confirmed whether or not the special articles are held in the special weighing hopper 105. In addition, the quantity loaded therein may be calculated and the weight of the special articles loaded therein may be controlled based upon the set weight.

In the combination weighing apparatus of the present embodiment, an example can be provided in which the articles are snack foods and the special articles are prize cards. At this time, the combination weighing apparatus 1 combination weighs the snack foods such that they are within a set weight range, and also adds the cards according to predetermined conditions. In this way, by employing the combination weighing apparatus 1, it becomes possible to insert the cards only during a discharge that satisfies the predetermined conditions. Moreover, because the cards are light, there is almost no difference in weight even if the cards are not added.

<Modifications>

(A)

The combination weighing apparatus 1 according to the aforementioned embodiment combination weighs the normal weighing hoppers 5 and discharges the articles.

The aforementioned embodiment can be modified by including a target hopper range switching function in the controller 20, and modifying the apparatus so that all of the weighing hoppers conduct combination weighing (second selection mode). By removing the guide plate 100, it becomes possible to conduct combination weighing with all of the weighing hoppers, or in other words, conduct normal combination weighing. By including a target hopper range switching function, the process that takes place when the CPU 21 runs the discharge routine 33 can be modified.

(B)

In the combination weighing apparatus according to the aforementioned embodiment, the discharge routine 33 transmits a signal that opens the gate 105a when the discharge of gate 105a is assigned by the assignment routine 31.

However, when a predetermined condition is included such that a constant discharge of the special articles occurs, or in other words, parent-child weighing, it becomes possible to add articles that have been combination weighed and continually discharge the special articles. In addition, by including a switching function that enables the selection of parent-child weighing and other predetermined conditions, it becomes possible to discharge articles in response to many types of discharge conditions.

(C)

In the combination weighing apparatus 1 according to the aforementioned embodiment, the weight of the special articles that are held in the special weighing hopper 105 are not included when combination weighing takes place.

An example of a modification with respect to this will be provided as follows. The special weighing hopper 105 is capable of measuring the weight of the special articles held therein. Because of this, when the discharge of the special articles held in the special weight hopper 105 is assigned, it becomes possible to combination calculate the weights of the normal hoppers 5 so that the weight of the special weighing hopper 105 is subtracted from the set weight range (reduced weight range). In this way, when the predetermined condition is satisfied, the special articles can be included and combination weighing can take place.

In addition, although there is only one special head, it is possible to include two or more heads. In this case, the special articles supplied by each special head may be different. In addition, the normal heads do not have to be limited to only one article, but rather it is also possible to partition them into two or more classes by using guide plates 100, supplying separate articles to each class, and conduct a so-called mixed weighing that mixes and weighs these articles.

Furthermore, when a predetermined condition is included that continuously discharges special articles, in other words, parent-child weighing, it becomes possible to combination weigh special articles continuously included therein. In addition, by including a switching means that makes it possible to select from parent-child weighing and other predetermined conditions, it becomes possible to discharge articles in response to many types of discharge conditions.

As an example, a situation is provided in which the articles are a plurality of different types of small candy balls, and the special articles are large candy balls that serve as prizes. In addition, there are two different types of special articles, each of which having a different flavor or the like. The combination weighing apparatus 1 combines one of either type of large candy ball with the small candy balls and conducts combination weighing when a predetermined condition is satisfied. When the predetermined condition is not satisfied, only the small candy balls are combination weighed. In this way, a large candy ball can be added only when the predetermined condition is satisfied during discharge, and the total weight of the candy balls discharged can be placed within a set weight range. In addition, the discharge conditions for the two types of large candy balls, periodic conditions, random conditions, ratio conditions and the like can also be established. Moreover, when a setting is made so that parent-child weighing takes place by means of a switching means, a combination weighing takes place in which the large candy balls are continuously included.

(D)

The combination weighing apparatus 1 according to the aforementioned embodiment is a circular combination weighing apparatus in which the hoppers are disposed in a circular pattern, and the articles are dispersed by the circular dispersion feeder 2. However, the same process can occur with a linear combination weighing apparatus.

[Effects of the Invention]

In the combination weighing apparatus according to the present invention, the composition of a combination of articles can be changed because the plurality of hoppers are divided into groups, and discharge can be separately assigned to one group from among these groups.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A combination weighing apparatus for combining and discharging articles, said combination weighing apparatus comprising:

a plurality of hoppers that hold the articles;

memory means that stores said plurality of hoppers dividing them into a first group and a second group;

specification means for specifying a discharge from at least one hopper in said first group based upon a predetermined criterion;

weighing means for weighing articles held in said hoppers, said weighing means being provided at least in said hoppers in said second group;

selection means for conducting a combination calculation using the weights of said hoppers of only said second group obtained by said weighing means, and selecting hoppers based on the combination calculation such that a total weight of said selected hoppers is within a predetermined weight range; and discharge means for discharging the articles held in said hoppers selected by said selection means and the articles held in said hopper specified by said specification means.

2. The combination weighing apparatus according to claim 1, wherein said hoppers in said first group and said second group are configured so as to hold different types of articles.

3. The combination weighing apparatus according to claim 1, wherein said weighing means is disposed in at least one hopper in each of said first and second groups.

4. A combination weighing apparatus for combining and discharging articles, said combination weighing apparatus comprising:

a plurality of hoppers that hold the articles;

memory means that stores said plurality of hoppers dividing them into a first group and a second group;

specification means for specifying a discharge from at least one hopper in said first group based upon a predetermined criterion;

weighing means for weighing articles held in said hoppers, said weighing means being provided at least in said hoppers in said second group;

selection means for conducting a combination calculation using the weights of said hoppers obtained by said weighing means, and selecting hoppers based on the combination calculation such that a total weight of said selected hoppers is within a predetermined weight range;

discharge means for discharging the articles held in said hoppers selected by said selection means and in the articles held in said hopper specified by said specification means; and measurement switching means for switching between said first and second selection modes of said selection means and between said first and second discharge modes of said discharge means, said selection means selecting hoppers in one of a first selection mode and a second selection mode, in said first selection mode said selection means conducting the combination calculation and selecting hoppers from only said second group such that the total weight of selected hoppers is within the predetermined weight range, in said second selection mode said selection means conducting a combination calculation and selecting hoppers from both said first and second groups such that the total weight of selected hoppers is within the predetermined weight range; and said discharge means conducting one of a first discharge mode and a second discharge mode, in said first discharge mode said discharge means discharging articles from the hoppers in said second group selected by said selection means in said first selection mode and the articles in the hopper specified by said specification means, in said second discharge mode said discharge means discharging articles selected by said selection means in said second selection mode.

5. The combination weighing apparatus according to claim 4, wherein said selection means subtracts the weight of said hopper in said first group specified by said specification means from the predetermined weight range to obtain a reduced weight range, and conducts the combination calculation and selects hoppers from said second group such that the total weight of the selected hoppers is within the reduced weight range.

6. The combination weighing apparatus according to claim 1, wherein said predetermined criterion of said specification means is based upon a random number signal.

7. The combination weighing apparatus according to claim 1, wherein said predetermined criterion of said specification means is based upon periodic conditions.

8. The combination weighing apparatus according to claim 1, wherein said predetermined criterion of said specification means is based upon ratio conditions.

9. The combination weighing apparatus according to claim 6, wherein said specification means further includes a continuous discharge criterion under which a discharge from said hopper in said first group is continuously specified; and said combination weighing apparatus further comprises discharge switching means that switches between said predetermined criterion and said continuous discharge criterion.

10. The combination weighing apparatus according to claim 7, wherein said specification means further includes a continuous discharge criterion under which a discharge from said hopper in said first group is continuously specified; and said combination weighing apparatus further comprises discharge switching means that switches between said predetermined criterion and said continuous discharge criterion.

11. The combination weighing apparatus according to claim 8, wherein said specification means further includes a continuous discharge criterion under which a discharge from said hopper in said first group is continuously specified; and said combination weighing apparatus further comprises discharge switching means that switches between said predetermined criterion and said continuous discharge criterion.

12. A combination weighing apparatus for combining and discharging articles, said combination weighing apparatus comprising:

a plurality of hoppers that hold the articles;

a plurality of load cells provided in at least one of said hoppers;

an operation panel for receiving an operator's input; and a controller operatively connected to said plurality of hoppers, said plurality of load cells, and said operation panel, said controller selecting hoppers for discharge based on at least one of a first criterion of combination calculation and a second criterion set by the operator, said first and second criteria each being applied to at least one of said hoppers, under said first criterion said controller selecting hoppers such that the total weight of articles in selected hoppers as determined by said load cells is within a predetermined weight range;

a chute for discharging the articles held in said selected hoppers selected by said controller, said controller conducting combination calculation in one of a first selection mode and a second selection mode, in said first selection mode said controller conducting the combination calculation and selecting hoppers from all of said hoppers except the at least one hopper to which said second criterion is applied such that the total weight of articles in selected hoppers based on said first criterion is within the predetermined weight range whether or not a hopper is selected based on said second criterion, while a hopper may be selected based on said second criterion, in said second selection mode said controller conducting a combination calculation and selecting hoppers from all of said hoppers such that the total weight of selected hoppers is within the predetermined weight range.

13. The combination weighing apparatus according to claim 12, wherein said load cells are disposed in all of said hoppers.

14. The combination weighing apparatus according to claim 13, wherein said controller switches between said first and second selection modes based on the operator's input.

15. The combination weighing apparatus according to claim 13, wherein said controller subtracts the weight of said hopper selected according to said second criterion from the predetermined weight range to obtain a reduced weight range, and selects hoppers according to said first criterion from the rest of said hoppers such that the total weight of the hoppers selected according to said first criterion is within the reduced weight range.

16. The combination weighing apparatus according to claim 12, wherein said second criterion of said controller is configurable by the operator through said operation panel.

17. The combination weighing apparatus according to claim 12, wherein said second criterion of said controller is based upon a random number signal.

18. The combination weighing apparatus according to claim 12, wherein said second criterion of said controller is based upon periodic conditions.

19. The combination weighing apparatus according to claim 12, wherein said second criterion of said controller is based upon ratio conditions.

20. The combination weighing apparatus according to claim 16, wherein said controller further includes a continuous discharge criterion that is applied to said hopper to which said second criterion is applied, said hopper being continuously discharged under said continuous discharge criterion; and said controller switches between said second criterion and said continuous discharge criterion upon the operator's input.

* * * * *